United States Patent [19]

Clarke

[11] 4,456,649

[45] Jun. 26, 1984

[54] LOW-COST, HIGHLY FILLED, WAX-BASED HOT MELT ADHESIVES AND COATINGS

[75] Inventor: Wayne C. Clarke, Richmond, Va.

[73] Assignee: Manville Service Corporation, Denver, Colo.

[21] Appl. No.: 357,965

[22] Filed: Mar. 15, 1982

Related U.S. Application Data

[63] Continuation of Ser. No. 228,635, Jan. 26, 1981, abandoned, which is a continuation of Ser. No. 081,296, Oct. 2, 1979, abandoned.

[51] Int. Cl.$^3$ ............................................. B32B 17/10
[52] U.S. Cl. ................................... 428/285; 156/334; 428/286; 428/440; 428/438; 428/442; 428/486; 428/514; 524/488; 524/489; 524/502
[58] Field of Search ............... 428/486, 514, 438, 440, 428/442, 394, 285, 286; 156/334; 524/502, 488, 489

[56] References Cited

U.S. PATENT DOCUMENTS

| | | | |
|---|---|---|---|
| 3,533,976 | 10/1970 | Eidman | 260/28.5 AV |
| 3,702,314 | 11/1972 | Farjon et al. | 260/28.5 AV |
| 3,745,054 | 7/1973 | Smedberg | 525/211 |
| 3,914,489 | 10/1975 | Smedberg | 260/28.5 AV |
| 4,010,128 | 3/1977 | Saggese et al. | 260/28.5 AV |
| 4,012,547 | 3/1977 | Smedberg | 260/28.5 AV |
| 4,146,521 | 3/1979 | Godfrey | 260/28.5 AV |
| 4,169,082 | 9/1979 | Kusterer, Jr. | 260/23 AR |
| 4,190,565 | 2/1980 | Cook et al. | 260/27 R |

OTHER PUBLICATIONS

Skeist, Handbook of Adhesives, Reinhold Publishing Corp., 1962, Chapter 36, pp. 447-451.
Houwink et al., Adhesion and Adhesives, Elsevier Publ. Co., 1965, vol. I, pp. 293, 294, 313-318.
EVA Copolymers, Brinker, Adhesives Age, Aug. 1977, pp. 38-44.
Re-Evaluating Hot Melt Adhesives, Adhesives Age, Mar. 1966, pp. 28-31.
Property/Composition, Profiles of Hot Melt Adhesive Systems, Brown, pp. 41-44, Adhesive Age, Aug. 1977.
Co. Mer. EVA Resins for Hot Melt Adhesives, Union Carbide Corp., 25 pp., 12/69, F-42589.

*Primary Examiner*—Theodore E. Pertilla
*Attorney, Agent, or Firm*—Ronald M. Halvorsen; Richard K. Thomson

[57] ABSTRACT

This invention relates to holt melt adhesives for use in coating and/or laminating paper. Conventional hot melt adhesives used to manufacture a coated or laminated product with good vapor barrier characteristics are based on ingredients compounded with significantly lower proportions of inert low cost filler materials. The present invention provides a hot melt adhesive/coating blend which not only provides a moisture vapor barrier and/or bonding but also significantly reduces the quantity of more expensive ingredients through the use of a large quantity of a lower cost ultra fine ground inert inorganic filler material and a low cost modifying hydrocarbon resin. The blend or composition consists essentially of, in parts by weight, up to about 25 parts of a hi melt point paraffin wax, 10-30 parts of a modifying hydrocarbon resin, 1-20 parts of an elastomeric copolymer, and 20-85 parts of an inert inorganic filler material. Preferably the blend additionally contains up to about 25 parts of a microcrystalline wax. The material is inexpensive, can be readily reactivated by heating, can be applied as a continuous coating, has excellent non-blocking and MVTR properties, holds the filler material in suspension, is inexpensive, has good polymeric tensile properties, is not tacky when cold, has good cold cracking resistance at low temperature and may be readily recycled.

5 Claims, No Drawings

LOW-COST, HIGHLY FILLED, WAX-BASED HOT MELT ADHESIVES AND COATINGS

This is a continuation of application Ser. No. 228,635, filed 01/26/81, abandoned, which in turn is a continuation of application Ser. No. 81,296, filed 10/2/79, abandoned.

TECHNICAL FIELD

This invention relates to adhesives and particularly rlates to hot melt adhesive. Still more particularly, the instant invention relates to wax-based hot melt adhesives particularly useful for adhering facings to building products and thermal insulations.

BACKGROUND OF PRIOR ART

Wax-based hot melt adhesives or coatings have been used for many years. Hot melt adhesives are bonding and coating agents which achieve a solid state and resultant strength by cooling as contrasted with other adhesives which achieve the solid state through evaporation or removal of solvents. Prior to heating, a hot melt adhesive is a thermoplastic, 100% solid material. When heated to approximately 275° to 400° F., the material is brought to a liquid state, and after the heat is removed, it sets usually by simple cooling. Hot melts offer the possibility of instantaneous bonding, especially when joining previously uncemented and often smooth impermeable surfaces.

When a hot melt adhesive comes in close contact with a surface to be bonded, a molecular layer of film at the surface of this substrate immediately attains a temperature approaching that of the hot melt through conductive heat transfer. Furthermore, a high degree of wetting, almost coalescence, of the hot melt coating and the surface material occurs. Directly afterward, the melt loses heat to substrates disposed on opposite sides of the melt or to a single substrate located on one side of the coating and to the processing evnironment on the other side of the coating until a temperature equilibrium is attained. Normally in a hot melt adhesive coating process, the temperature of the entire adhesive substrate cohesive strength for a particular finished product end use.

In short, hot melt adhesives achieve a solid state and resultant strength through cooling, as contrasted with other adhesives which achieve the solid state through evaporation or removal of solvents or through polymerization and/or crosslinking. As has been noted, hot melts contain no solvents and are 100% thermoplastic.

The ideal hot melt adhesive would be solid at room temperature and capable of being stored and handled easily without blocking. Upon heating, it would melt sharply and flow freely. It would be stable even with prolonged heating and able to withstand local overheating. In liquid-melt form, it could be applied to the work by nozzle, wheel, wet coating head, or spray. When used for lamination, its point of solidification would be such that ample time would be availble to close the bond with only minimum pressure. Of course, bonds accomplished with this ideal hot melt would be strong and the range of materials which it could bond would be wide. Finally, the composition of the hot melt would be such that paper products bonded with the adhesive could be reclaimed by some simple process. These are general requirements. A quality that might be particularly desirable for one application could be unimportant for another. In any case, a hot melt adhesive should be in a liquid state at some elevated temperature in order to meet requirements as a hot melt; yet it must set to a cohesive solid state in the anticipated ambient temperature environment of the finished product containing the hot melt adhesive as a component.

Hot melt adhesive formulations vary widely depending upon raw materials, intended end use, properties and price considerations. Hot melt systems most often consist basically of a polymer and a diluent. The polymer is the essential ingredient and is the backbone or strength component of the hot melt adhesive. Almost any thermoplastic polymer with adequate resistance to heat degradation can be used. Examples of practical polymers are polyethylene, polyvinylacetate, ethylene-vinyl acetate (EVA) and ethylene-ethyl acrylate (EEA) copolymers. On the other hand, polyvinyl chloride and nitrocellulose are less practical because of their limited heat stability.

The molten viscosity of a polymer in a given system is proportional to its molecular weight. A hot melt adhesive could be 100% polymer, but there often would be two major drawbacks: limited adhesion and lack of molten properties such as tack, application temperature range and wetting ability.

The polymer as a component of hot melt adhesives, often produces low viscosity, low strength and poor mechanical properties when its molecular weight is relatively low. In contrast, a relatively high molecular weight polymer produces high viscosity, high strength and good mechanical properties. Because the properties of the polymer are a dominant factor in the performance of most hot melt adhesive, it is generally desirable to use relatively high molecular weight polymers in formulations.

The second component of hot melt adhesives is the diluent system. The diluent system makes it possible to utilize the properties of the polymer. It is usually a blend of materials such as wax, plasticizer, tackifying or plasticizing resin like wood rosin or rosin esters, stabilizers and sometimes inert pigments or extenders.

The diluent system provides a variety of effects. It is the vehicle for the polymer thereby lowering the viscosity of the hot melt and making it more convenient to apply. It enhances the wetting ability and adhesive strength of the polymer. It provides molten tack and tack range. It contributes barrier properties and gloss and provides a means of making the polymer rigid or flexible.

The diluent for a hot melt remains in the system when a hot melt is applied and is not dissipated or absorbed. Any hot melt bond reflects the composite properties of all its components, including the diluent. If in the interests of machinability and low cost, lower molecular weight polymers are used combined with a high percentage of diluents, the effectiveness of a polymer in imparting its characteristics to a hot melt adhesive is reduced. The desirable polymer properties of toughness, heat resistance and low temperature flexibility are diminished almost in direct proportion to the molecular weight and concentration of the polymer.

Prior art wax-based hot melt adhesives particularly useful for adhering facings to building products and thermal insulations are usually characterized by their high cost. Typically the hot melt adhesives that are based on low cost ingredients either do not provide a moisture vapor barrier and/or do not provide sufficient bonding strength. At times kraft facings for building products and thermal insulations have been coated with an asphalt based compound to provide bonding and vapor barrier requirements. However, such a facing is characterized by its tendency to block (e.g., for a layer of coated facing to stick to the layer below it) and potental environmental problems associated with the application of the asphalt coating or the use of the coated facing. The asphalt compounds of the past are thus not appropriate for certain applications.

Certain large carpet manufacturers utilize EVA based hot melt adhesives which include a high percentage of fillers, i.e., up to 60% by weight in order to reduce costs. However, these EVA based adhesives do not provide a moisture vapor barrier which is especially necessary in coating kraft paper for use in bonding facings onto insulations at the manufacturing location.

An example of barrier properties, especially for the frozen food field, is found in ethylene-vinyl acetate blends with petroleum waxes. These coatings which usually have good gloss and heat sealability are specifically designed as barrier coatings. However, here the primary desired features are coating properties and esthetic properties with less emphasis on an ability to bond a variety of substrates, molten tack, tack range or strength characteristics.

Prior art hot melt and asphalt based adhesives have a definite "tack" or stickiness at room temperature. When these have been used to coat sheet materials which are commonly rolled for storage or shipment (and are therefore hereinafter referred to as "roll goods") it has been necessary to take steps to prevent the sticky adhesive on one layer of the roll from adhering to the sheet which forms the next layer of the roll. Such means have included incorporating paper separators as part of the roll and/or dusting the sheet surface with materials such as talc, or coating the obverse side of the facing with a release agent. This, of course, adds substantial additional fabrication and material costs as well as incorporating into the roll goods materials such as separating paper and talc which are not needed for the end use of the roll goods and therefore must be removed and discarded by the user.

In many instances, the hot melt adhesives which are applied to sheets to form adhesive jacketing materials which are used as vapor barrier facings for building materials and thermal insulations, are installed outdoors or in other environments where they are subjected to humidity and/or low temperatures with resultant cold cracking. This cold cracking often caused hot melt adhesives to be rejected for use in many applications where they would otherwise have been quite suitable.

BRIEF SUMMARY OF THE INVENTION

The present invention procides a low-cost, highly-filled, wax-based hot melt adhesive especially useful for coating and/or adhering facings to building products and thermal insulations. A hot melt adhesive blend of the present invention consists essentially of, in parts by weight, up to 25 parts of a high melting point paraffin wax, 10 to 30 parts of a mdifying hydrocarbon resin, 1 to 20 parts of an elastomeric copolymer, and 20 to 85 parts of an ultra-fine ground, inert, inorganic filler material. Preferably, the blends of the present invention also include up to 25 parts of a microcrystalline wax.

The low cost hot melt coating and adhesive of the present invention is suitable for coating and laminating paper and is amenable to application as a continuous film. Furthermore, the hot melt blend of the present invention is characterized by its low cost caused by the use of a high percentage of filler, excellent moisture vapor transmission rato (MVTR), satisfactory bonding and strength properties, tacking at high temperatures, nonblocking of coated surfaces and cold cracking resistance. Lastly, the hot melt blend of the present invention allows bonded paper products to be reclaimed by a simple process.

In particularly preferred embodiments, the paraffin wax will be a fully refined paraffin wax with a melting point (ASTM D87) between the limits of 135° to 150° F., the modifying hydrocarbon resin will be a low moleular weight, thermoplastic hydrocarbon resin, the elastomeric copolymer will be an ethylene-vinyl acetate copolymer resin and the inert inorganic filler will be ultra fine ground limestone. Furthermore, the microcrystalline wax or dark micro wax will be a partially refined paraffin wax (petrolatum).

DETAILED DESCRIPTION OF THE PREFERRED EMBODIMENTS

The first major component of the composition or blend of the present invention is a high melt point paraffin wax. This will normally be a wax with a melt point on the order of 135° F. or higher, preferably in the range of about 135° to 150° F. (57.22° to 65.56° C.). Particularly preferred are fully refined paraffin waxes having melt points of approximately 143° F. (61.7° C.). The paraffin wax will be nominally present as 15 parts by weight of the total composition or blend, with a preferred range of up to about 25 parts by weight. The product which has been found particularly useful in the blends of the present invention is a Hi test paraffin wax which provides relatively high melting point properties and is sold under the trademark of "Paraffin Wax Code 1087" by Boler Petroleum Company, Wayne, Pennsylvania.

While the Hi test paraffin has been noted to have a melting point lying between 135° to 150° F., this temperature range is merely one which has been found most suitable for the blend of the present invention. It should be noted therefore that the higher temperature ranges are better for purposes of application although the cost of the paraffin increases with a concomitant increase in the cost of the blend. The temperature range for the melting point of the Hi test paraffin should be based on the end use of the product, but for coating and for laminating paper products such as kraft paper, kraft paper to paper, kraft liner board to paper and paper to paper, as in the present invention, the temperatures specified above are quite appropriate.

Also present in the composition will be a modifying hydrocarbon resin. The flaked, solid resins produced mainly from aromatic monomers are suggested for use in the present invention. The resin color is not important; consequently a low-cost resin may be utilized. The material functions as a tackifier and, with the paraffin wax, serves to wet out large proportions of an inert filler which is used in the presently disclosed blend. The inert filler is an ultra-fine ground inert inorganic filler material and will be more fully described, infra. The hydrocarbon resin will normally be present as from 10 to 30 parts by weight of the composition and preferably about 16–20 parts by weight. One material which has been found to be particularly preferable is sold by Hercules, Inc., Wilmington, Delaware under the trademark "Piccomer XX100 BHT" resin, a dark colored, inert, low molecular weight thermoplastic hydrocarbon resins produced largely from aromatic monomers. A suitable substitute has also been found to be sold by Hercules Inc. under the trademark "Terate 131" or "Terate 303." Terate 131 is a dark brown, balsamic resin derived from petroleum aromatic hydrocarbons in the production of dimethyllterephthalate. It is a complex high boiling mixture of ester substituted diphenyl and polyphenyl aromatic compounds with low unsaturation, and is highly resistant to oxidation. Terate 303 resin is an ester of functionally substituted diphenyl and polyphenyl compounds with low unsaturation and high resistance to oxidation. Terate 303 resin is derived from pletroleum aromatic hydrocarbons differing from most hydrocarbon based resins in that it is a chemically reactive highly polar and insoluble in aliphatic hydrocarbon solvents. The modifying hydrocarbon resin serves several functions but should be primarily characterized as the type of resin which could be used to "wet-out" large proportions of pigments or completely encapsulate the ultra-fine inert inorganic filler material and which exhibits hot tack at elevated temperatures. The ability to wet-out and completely encapsulate the small particles of the inert filler allows a bond to be created between the other components of the blend so that the inert filler becomes an intricate component of the blend. This intricate blending or bonding allows high levels of the inert inorganic filler to be added to the blend of the hot melt adhesive thereby substantially lowering its cost while allowing it to still achieve a good vapor barrier.

Another component of the present invention will be an elastomeric copolymer which improves both the blend's tensile properties and cold crack resistance at low temperatures. Suitable for this use are ethylene-vinyl acetate (EVA) or ethylene-ethyl acrylate copolymers (EEA). These components will be present as 1 to 20 parts by weight and preferably 1 to 8 parts by weight of the composition or blend in order to control the cost of the blend. The EVA or EEA adds to the elastomeric strength properties of the blend. Furthermore, the EVA/EEA components make the blends of the present invention more viscous and more pressure sensitive at elevated temperatures. Lastly, the blends are made more flexible and less crystalline through the use of these copolymers.

Still another component and one of the components which allows the present blend to be cost effective and inexpensive for the applications noted above, will be an ultra fine ground, inert, inorganic filler. This will be present in amounts from 20 to 85 parts by weight and preferably, in order to sharply reduce blend cost, 50 to 85 parts by weight. A material which has been found to be satisfactory as the inert, inorganic filler material is ultra fine ground limestone or calcium carbonate. The ultra fine ground limestone preferably should have a residue of less than or equal to 0.01% on a 325 mesh screen as measured using the testing method defined in ASTM D1199. Suitable substitutes for the calcium carbonate may be selected from the group consisting essentially of ultra fine ground clay, glass, perlite, other carbonates and silicas.

Preferably, another major component which may form a part of the present invention is a microcrystalline paraffin wax or dark micro wax which is less crystalline than the Hi test paraffin and tends to make the blends of the present invention more plastic, less brittle, more suitable for laminating as its proportion increases and lowers the cold crack temperature of the blends. When the amount of paraffin wax is reduced, the amount of micro wax used may be increased proportionally. Adhesive properties for laminating increase in the present invention as the amount of micro wax increases and the amount of paraffin wax decreases. A variety of useful dark micro waxes are available but a dark micro wax which has been found suitable in the present invention is sold under the trademark of "P8050" by Moore and Munger, Inc., Fairfield, Connecticut. This is a petrolatum product, brown in color, having a congealing point of about 150° F., a viscosity (Saybolt) at 210° F. of 45 and a flash point of 420° F. Normally, dark micro wax may be present up to about 25 parts by weight and nominally about 5 parts by weight.

The hot melt adhesive composition or blend of the present invention remains stable with the additions of 20 to 50 parts per millions of an antioxidant such as butylated hydroxytoluene (BHT) at temperatures on the order of 200° F. to 350° F. for extended periods of time that are substantially longer than 72 hours. The material is not tacky or adherent after application and cooling and can be described as a hard material. However, it can be readily reactivated by heating the substrate. Thus, it is ideally suited as an adhesive for roll goods since it is applied hot, cooled to form a hardened material prior to rolling and the rolled material can be shipped and stored easily for indefinite periods of time and be readily reactivated by the end user at the appropriate time without blocking.

Also, the hot melt adhesive generates no objectionable or harmful quantities of smoke. The hot melt composition also allows bonded paper products to be reclaimed by a simple process in which the products are recycled in a beater box and reused on a cylinder board machine. The blends of the present invention are less expensive than prior art adhesives of the hot melt type (wherein good bonding and a good moisture vapor barrier are requirements) because of the high degree of filling utilizing the ultra-fine ground inert, inorganic fillers. The expense of the blends is also reduced through the use of inexpensive grades of modifying hydrocarbon resins and microcrystalline wax.

The blend, when used as a coating on substrates, acts as a moisture barrier and has excellent elastomeric cohesive properties such as tensile strength, shear strength, etc. The blend also exhibits a good moisture vapor transmission ratio (MVTR) in part because the Hi test paraffin is rejected or exuded from the exposed surface layer of the blend when the blend, used as a coating, cools. As is well known, wax itself provides a good moisture barrier so that when the blend is cooled, the Hi test paraffin is exuded from the coating and provides an additional coating. This exudation phenomenon takes place each time the blend is melted and subsequently cooled. The exudation of the Hi test paraffin wax takes place despite the fact that the blend is highly filled with an ultra-fine ground inert inorganic material. This is apparently due to the fact that the modifying hydrocarbon resin which encapsulates the filler material becomes less miscible with the paraffin wax as the blend temperature drops. This unique blend of paraffin wax, hydrocarbon resin and elastomeric copolymer thus effectively wets out the filler while simultaneously achieving desired blend properties.

Finally, the adhesive blend is blendable at a temperature of about 315° F. and can be applied in manufacture over a temperature range of 200° F. to 400° F. by conventional hot melt coating techniques. Application of the hot melt adhesive to sheets such as facing substrates and the like can be accomplished by conventional slot coaters which form a thin continuous film of adhesive on a moving sheet of substrate. Most preferably, the coating or adhesive is applied using a conventional doctored hot roll coater.

While the adhesive of the present invention may also be applied in discrete units such as dots or strips to a substrate, it will be understood that the material of this invention cannot, if applied in discrete units, serve as a vapor barrier since there are voids between the discrete units. However, the blends still impart cold crack resistance, hot tack upon reactivation, and provide a low blend cost.

The following are four examples of particular combinations of components that have worked well utilizing the concepts described above. The components are listed as parts by weight.

EXAMPLE 1

| Component | Parts |
| --- | --- |
| Hi Test Paraffin | 15 |
| "Piccomer XX100 BHT"[1] | 20 |
| "Elvax 250"[2] | 5 |
| "Camel Wite"[3] | 60 |

[1]"Piccomer XX100 BHT", a trademarked proprietary product of Hercules Incorporated.
[2]"Elvax 250", a trademarked proprietary product of E. I. duPont de Nemours & Co. an ethylene/vinyl acetate copolymer.
[3]"Camel Wite", a commercial product of H. T. Campbell Sons' Co., a fine ground limestone.

1. "Piccomer XX100 BHT", a trademarked proprietary product of Hercules Incorporated.

2. "Elvax 250", a trademarked proprietary product of E. I. duPont de Nemours & Co, an ethylene/vinyl acetate copolymer:

3. "Camel Wite", a commercial product of H. T. Campbell Sons' Co., a fine ground limestone.

EXAMPLE 2

| Component | Parts |
| --- | --- |
| Hi Test Paraffin | 15 |
| "Piccomer XX100 BHT" | 16 |
| "Elvax 250" | 4 |
| "Camel Wite" | 60 |
| Dark Micro Wax | 5 |

EXAMPLE 3

| Component | Parts |
| --- | --- |
| Hi Test Paraffin | 15 |
| "Terate 131" or "Terate 303"[4] | 16 |
| "Elvax 250" | 4 |
| "Camel Wite" | 60 |
| Dark Micro Wax | 5 |

[4]"Terate 131" and "Terate 303" are trademarked proprietary products of Hercules Incorporated described supra.

EXAMPLE 4

| Component | Parts |
| --- | --- |
| Hi Test Paraffin | 15 |
| "Piccomer XX100 BHT" | 16 |
| Bukelite DPP6169[5] | 4 |
| "Camel Wite" | 60 |
| Dark Micro Wax | 5 |

[5]A trademark of the Union Carbide Corporation for ethylene ethylacrylate elastomeric copolymer having 18% ethylacrylate, 82% ethylene level.

The products utilizing these formulations were applied a foil/kraft facing material using commercial coating equipment to apply the adhesive as a coating spread across the facing sheet. The sheet containing the coating was rolled after the adhesive had cooled using conventional rolling equipment. It was later found to be readily capable of being unrolled without any significant tearing or adhesion of the adhesive to adjacent layers of facing. Thereafter, the unrolled facing was applied to glass fiber thermal insulation by heating the facing to reactivate the hot melt adhesive and adhering the facing to the glass fiber while the adhesive was still hot. No subsequent delamination occurred.

The blend illustrated as Example 1 was not as flexible as the other examples due to the fact that Dark Micro wax was not present which tends to allow the blends to be more flexible despite repeated flexure. Example 1 would thus not be as flexible after more than one or two flexures as the other examples.

The blend illustrated as Example 2 is the preferred blend for laminating facing materials to building products and fiber glass insulations and has been found to be inexpensive, highly mixable, non-blocking at storage temperatures of up to about 130° F., and have an excellent MVTR. Furthermore, Example 2 has shown an ability to accept and hold the inert filler material in suspension using only low shear rate propellor type dispensers despite being highly filled.

Example 3 illustrates that "Terate 131" or "Terate 303" may be substituted for "Piccomer XX100 BHT", which is used as the preferred modifying hydrocarbon resin in the present invention. Example 4 tends to illustrate the equivalence of an EEA formulation with the preferred EVA formulation of Example 2.

What is claimed is:

1. A substrate having a composition deposited as a continuous coating thereon, said composition consisting essentially of in parts by weight:
   high melt point paraffin: about 15 parts.
   dark microwax: about 5 parts.
   hydrocarbon resin: about 16 parts.
   elastomeric copolymer: about 4 parts.
   ultrafine ground inert, inorganic filler: about 60 parts.

2. A coated substrate as in claim 1 wherein said hydrocarbon resin is a low molecular weight thermoplastic hydrocarbon resin and wherein said elastomeric copolymer is an ethylene vinyl acetate copolymer resin.

3. A coated substrate as in claim 1 wherein said substrate is a foil/Kraft paper.

4. A coated substrate as in claim 1 wherein said coated substrate is a facing for fiber glass thermal insulation.

5. A coated substrate as in claim 4 wherein said continuous coating of said comosition forms a vapor barrier for said glass fiber thermal insulation.

* * * * *